(12) United States Patent
Bhargava et al.

(10) Patent No.: US 7,554,928 B2
(45) Date of Patent: Jun. 30, 2009

(54) CLUSTERING METHODS FOR SCALABLE AND BANDWIDTH-EFFICIENT MULTICAST

(75) Inventors: Punit Bhargava, Sunnyvale, CA (US); Rina Panigrahy, Sunnyvale, CA (US); Sriram C. Krishnan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 817 days.

(21) Appl. No.: 11/095,737

(22) Filed: Apr. 1, 2005

(65) Prior Publication Data

US 2006/0222012 A1 Oct. 5, 2006

(51) Int. Cl.
H04L 12/26 (2006.01)

(52) U.S. Cl. ...................... 370/252; 370/389

(58) Field of Classification Search .............. 370/252, 370/253, 351, 389, 390, 392, 473, 477, 432
See application file for complete search history.

(56) References Cited

U.S. PATENT DOCUMENTS

| | | | |
|---|---|---|---|
| 6,950,434 B1 | 9/2005 | Viswanath et al. | 370/3 |
| 6,980,518 B1 | 12/2005 | Sun et al. | 370/2 |
| 7,065,079 B1 * | 6/2006 | Patra et al. | 370/390 |
| 2002/0196782 A1 | 12/2002 | Furukawa et al. | 370/35 |
| 2004/0146062 A1 * | 7/2004 | Parikh et al. | 370/419 |
| 2004/0174820 A1 | 9/2004 | Ricciulli | 370/24 |
| 2005/0131912 A1 * | 6/2005 | Lin et al. | 707/100 |
| 2005/0190765 A1 * | 9/2005 | Gotoh et al. | 370/390 |
| 2005/0270983 A1 | 12/2005 | Remedios | 370/25 |
| 2006/0029092 A1 * | 2/2006 | Luo et al. | 370/432 |

OTHER PUBLICATIONS

M.G.A. Marsan et al., "Compression of Multicast Labels in Large IP Routers," IEEE Journal on Selected Areas in Communications, vol. 21, No. 4, pp. 630-641 (May 2003).
R. Peeters, "The Maximum Edge Biclique Problem is NP-Complete," Discrete Applied Mathematics, vol. 131, pp. 651-654 (2003).
N. McKeown et al., "Achieving 100% Throughput in an Input-Queued Switch," INFOCOM(1), pp. 296-302 (1996).
U. Feige, "Relations Between Average Case Complexity and Approximation Complexity," Proceedings of the 34th Annual ACM Symposium on Theory of Computing, pp. 534-543 (ACM Press 2002).
S. Keshav and R. Sharma, "Issues and Trends in Router Design," IEEE Communications Magazine, pp. 144-151 (May 1998).

(Continued)

*Primary Examiner*—Ricky Ngo
*Assistant Examiner*—Gary Mui
(74) *Attorney, Agent, or Firm*—Campbell Stephenson LLP; Jonathan N. Geld

(57) ABSTRACT

A method, system, computer program product, and apparatus for reducing wasted bandwidth due to supercasting multicast cells through a router switch fabric is presented. A multicast destination address is compared to each destination address in a label-to-destination address table (LTDT) to determine the wasted bandwidth due to incorporating any additional switch fabric ports designated by the new destination address with beyond the switch fabric ports designated for each LTDT entry. Also considered is the amount of traffic experienced by each LTDT entry and that expected for the new destination address.

22 Claims, 10 Drawing Sheets

OTHER PUBLICATIONS

Park, Jung Min; Chong, E.K.P.; Siegel, H.J.; "Efficient Multicast Packet Authentication Using Signature Amortization;" Proceedings of the 2002 Symposium on Security and Privacy; IEEE 2002; pp. 227-240.

Canetti, Ran; Garay, J.; Itkis, G.; Micciancio, D.; Naor, M.; Pinkas, B., Multicast Security: A Taxonomy and Some Efficient Constructions, INFOCOM '99. 18th Annual Joint Conference of the IEEE Computer and Communications Soncietes, Proceeds, IEEE vol. 2, Mar. 21-25, 1999; vol. 2; pp. 708-716.

Wong, Chung Kei; Lam, S.S., Digital signatures for flows and multicasts, Networking, IEEE/ACM Transactions on vol. 7, Issue 4, Aug. 1999 pp. 502-551.

Bhargava, Punit; Rina Panigraphy; and Sriram C. Krishnan; "Constant Time Signature Methods for Scalable and Bandwidth-Efficient Multicast;" U.S. Appl. No. 11/149,877, filed Jun. 10, 2005; consisting of Specification, Claims and Abstract (29 pages); and Drawings (11 sheets).

* cited by examiner

ABCDEFG
405

EFGHIJKL
407

ABCD|EFG|HIJKL
409

410
```
1 1 0 0 1 0 1 1
0 1 1 0 0 1 0 1
1 0 0 1 0 0 1 0
0 1 0 1 0 1 0 1
```

420  *1 1 1 0 1 1 1 1*   Cost

| | | | | | | | | | |
|---|---|---|---|---|---|---|---|---|---|
| 421 | 1 | 1 | 0 | 0 | 1 | 0 | 1 | 1 | 2 |
| 422 | 0 | 1 | 1 | 0 | 0 | 1 | 0 | 1 | 3 |
| 423 | 1 | 0 | 0 | 1 | 0 | 0 | 1 | 0 | 5 |
| 424 | 0 | 1 | 0 | 1 | 0 | 1 | 0 | 1 | 4 |

CLUSTERING METHODS FOR SCALABLE AND BANDWIDTH-EFFICIENT MULTICAST

FIELD OF THE INVENTION

This invention relates to the field of information networks, and more particularly relates to transmitting multicast data packets within a router comprising a large number of network line cards.

BACKGROUND OF THE INVENTION

Today's network links carry vast amounts of information. High bandwidth applications supported by these network links include, for example, streaming video, streaming audio, and large aggregations of voice traffic. In the future, network bandwidth demands are certain to increase. In order to meet such demands, one method that has been used is logical distribution of nodes in a network to subnetworks containing nodes that exchange a substantial amount of traffic. The larger a network becomes, the greater the demand to subdivide that network becomes. Network nodes such as routers and switches become more complex as greater numbers of line cards leading to each subdivided network or to other network nodes are contained in a router or switch.

FIG. 1 is a block diagram showing a topology of a network. Network nodes 130(1)-(M) are connected to a node 110. Each network node in FIG. 1 may take the form of a router, switch, bridge, hub, or other network node such as a compute or disk server. For purposes of explanation, nodes 110 and 120 will be referred to as routers, it being understood that nodes 110 and 120 are not limited thereto. The connections between nodes 130(1)-(M) and router 110 permit the nodes to share data. Router 110 is connected to router 120 through link 150. Router 120 is further connected to a plurality of network nodes 140(1)-(N).

Variable identifiers "M" and "N" are used in several instances in FIG. 1 to more simply designate the final element of a series of related or similar elements. Repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "M" or "N" may hold the same or a different value than other instances of the same variable identifier.

Routers 110 and 120 can handle communications between segments of a large network. Such a network communication node can be responsible for establishing and providing tens of thousands of network connections.

FIG. 2 is a block diagram illustrating an exemplary router (e.g., router 110). In this depiction, the router includes a number (N) of line cards (210(1)-(N)) that are communicatively coupled to a switch fabric 220, which is also communicatively coupled to a processor 230. Line cards 210(1)-(N) each include a port processor 212(1)-(N) that is controlled by a line card CPU 219(1)-(N). Each port processor 212(1)-(N) is also communicatively coupled to an ingress packet processor 214(1)-(N) and an egress packet processor 218(1)-(N). The ingress and egress packet processors are communicatively coupled to a switch fabric interface 216(1)-(N) that is also communicatively coupled to the switch fabric 220. Each line card CPU 219(1)-(N) is also coupled to switch fabric interface 216(1)-(N), ingress packet processor 214(1)-(N), and egress packet processor (1)-(N).

When a packet is received by a router such as that illustrated in FIG. 2, the router can process the packet in the following manner. Upon receipt at a port, a packet is sent from one of the port processors 212(1)-(N) corresponding to the port at which the packet was received to an ingress packet processor 214(1)-(N). An ingress packet processor can analyze the destination address of the packet to perform address lookups, as more fully set forth below. Once processed by an ingress packet processor, the packet can be sent through a switch fabric interface 216(1)-(N) to switch fabric 220. Switch fabric 220 can route the packet information to any line card 210(1)-(N) for egress processing according to the destination address of the packet. Once received by a line card switch fabric interface 216(1)-(N), a packet can be analyzed by an egress packet processor 218(1)-(N), as more fully set forth below, and subsequently sent out through a port processor 212(1)-(N).

Switch fabric 220 can be implemented using a technique appropriate to the implementation. Common switch fabric technologies are busses, crossbars, and shared memories. A crossbar switch fabric, for example, can be thought of as 2n busses linked by n*n crosspoints. If a crosspoint is on, data on an input bus corresponding to the crosspoint is made available to a corresponding output bus. A processor 230 or a scheduler must turn on and off crosspoints for each set of packets transferred across the crossbar. Alternatively, one input bus can drive several output busses by having each crosspoint on, to achieve multicast, either selectively or in a permanent state. Another switch fabric technology is an asynchronous transfer mode (ATM) switch fabric core in which a permanent virtual circuit is established from each port to each other port. Incoming IP packets are fragmented into ATM cells and switched through the switch fabric and then the ATM cells are reassembled into packets before transmission.

A router, such as that illustrated in FIG. 2, can have a large number of line cards coupled to the switch fabric. Unique addressing of each of N-line cards can be accomplished by using $\log_2 N$ bits. For example, for 256 line cards, one needs eight bits to uniquely address each line card ($\log_2 256=8$). Such unique addressing can be found in unicast traffic.

Multicast routing protocols enable multicast transmission, i.e., one-to-many connections, by replicating packets close to the destination, obviating the need for multiple unicast connections for the same purpose, thereby saving network bandwidth and improving throughput. Similarly, within a router, multicast between line cards is enabled by a multicast capable switch fabric. A cell corresponding to an IP multicast packet is sent once from a source line card to the switch fabric, then the switch fabric sends the cell to all the destination line cards, obviating needless consumption of line card to switch fabric bandwidth resulting from multiple unicast cell transmissions for the same purpose. But multicast destination addressing to encompass every combination of destination line cards requires a bitmap destination address of a length equal to the number of line cards (e.g., N bits, so for the above example of 256 line cards, one needs a 256-bit destination address to be carried by each cell).

FIG. 3 is a simplified block diagram illustrating an example of packet processing that occurs within a router, such as that illustrated in FIG. 2. An ingress packet 310 arrives from a network connected to a line card 320 (line card 320 corresponds, for example, to one of line cards 210(1)-(N)). The ingress packet includes a destination address, along with other data such as the source of the packet and the substantive content of the packet. The illustrated destination address is a multicast address 315 formatted according to internet protocol (IP). In a network operating according to the multi-layer OSI network model, an IP packet such as that illustrated can be encapsulated in a lower level format packet, such as an ethernet packet. Line card 320 will remove encapsulation that is unnecessary to the operation of the router. The line card will then assign a destination label to the multicast address according to the results of a look up table (LUT) comparison performed by an ingress packet processor (e.g., 214(1)-(N)). LUT 325 contains a set of labels corresponding to prior received multicast addresses; such labels are internal to the router and only used in the context of the router. Line card 320 can then fragment the ingress packet into a number of cells 330 that (a) are of a length and format appropriate to the internal architecture of the router, and (b) each contain the label 335 generated from LUT 325. Such fragmentation can be performed, for example, in a switch fabric interface 216(1)-(N).

Cell 330 is then passed to the router switch fabric 340, wherein the cell is directed to appropriate egress ports. A single multicast cell can have multiple destination egress ports. Switch fabric 340 will duplicate multicast cells and direct them to the appropriate destination ports, such operations being performed by a processor associated with the switch fabric (e.g., 230). The switch fabric can determine the destination egress ports for a cell by referencing a Label to Destination Table (LTDT) 345. LTDT 345 can contain an entry for each label, wherein an entry includes a bitmap of the egress ports from the switch fabric and reference to the bitmap provides information as to which switch egress ports the cell must be directed. Each label bitmap is a switch destination address 350. Once duplicated and sent through switch fabric 340, cells exit the switch fabric and are sent to egress line cards 360(1)-(X) that are coupled to corresponding switch egress ports. The egress line cards can then remove the cell label and reconstruct the original packet in preparation for transmission on networks connected to the egress line cards (such an operation can be performed by, for example, switch fabric interface 216(1)-(N)). An egress packet processor (e.g., 218(1)-(N)) on the egress line card can perform another address lookup to determine whether the egress line card should duplicate a packet for multiple multicast subscribers. A port processor (e.g., 212(1)-(N)) on an egress line card will encapsulate the outgoing packet in an appropriate form for the attached network.

As stated above, the more destination line cards that are present in a router, the longer a switch fabric destination address will need to be in order to uniquely address each multicast address combination. To have such a long destination address in each cell transmitted by a switch fabric will result in wasted space in each cell transported through the switch fabric (since, for example, a unicast cell, in a 256 line card router, need only 8 bits for a unique address versus 256 bits for a multicast destination address). The more line cards present in a router, the more bandwidth consumed by switching such large destination addresses.

Rather than provide a destination address that contains enough bits to uniquely address every multicast combination, and therefore wasting switch fabric bandwidth, an address field of a length between $\log_2 N$ (a unicast address length) and N (a multicast bitmap length) can be chosen. Such a shorter destination address field will not be able to uniquely address every combination of addresses directed to the N line cards. Over time, the number of multicast destinations that will need to be supported by the switch fabric will increase. Therefore, for several multicast destinations, the router switch will have to engage in "supercasting", wherein a multicast packet will ultimately be sent not only to subscribing line cards but also to one or more non-subscribing line cards that will ultimately drop the multicast packet.

Supercasting conserves bandwidth from a line card to the switch fabric by decreasing the length of the destination address field of cells being transferred within the router switch fabric. But during supercasting, bandwidth from a switch fabric to attached line cards will be wasted due to the transmission of cells to nonsubscribing line cards. Further, bandwidth-impacting inefficiencies also occur at the nonsubscribing line cards as processing must occur in the line cards in order to drop the packets.

What is therefore desired is a method of assigning destination addresses for multicast cells in a manner so that the amount of supercast, that is the amount of wasted bandwidth, is minimized, and thereby maximizing the useful throughput of the router.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention reduces wasted bandwidth due to supercasting multicast cells through a router switch fabric. Several methods have been developed to reduce such wasted bandwidth. Solutions that can be performed in a time-efficient manner can be implemented online, while solutions that can generate a more optimal solution but may take a longer time to perform can be implemented off-line.

If there are N links out of a router switch fabric, each multicast cell transmitted through the switch fabric can be sent to a subset of the N links (a destination address). As stated above, for a large capacity router, a destination address of N bits is too large to practically be used as a cell destination address. Therefore to conserve switch fabric bandwidth, an m-bit label corresponding to the destination address is generated, wherein $\log_2 N < m < N$.

Switch fabric destination addresses are mapped to labels through a label-to-destination address table (LTDT) accessible to the switch fabric. As stated above, since a label contains fewer bits than is required to uniquely identify each destination address corresponding to an IP multicast address, a label will correspond to more than one IP multicast address and therefore supercasting will occur.

Figure 1:
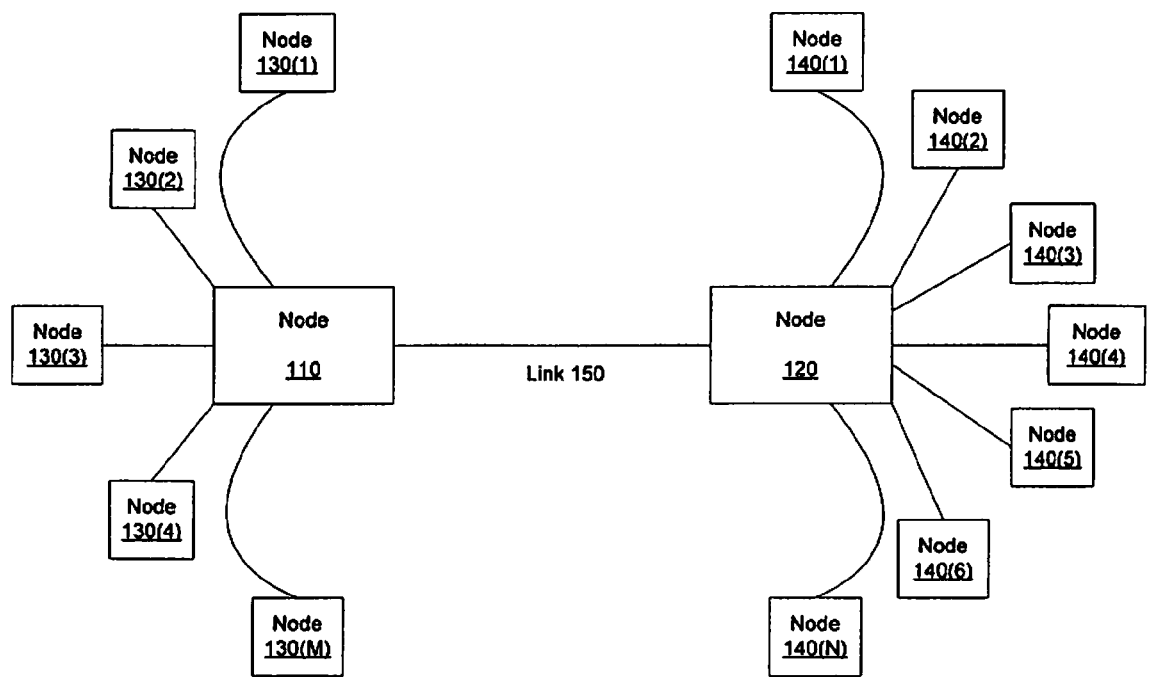
FIG. 1 is a block diagram showing a topology of a typical network.
Figure 2:
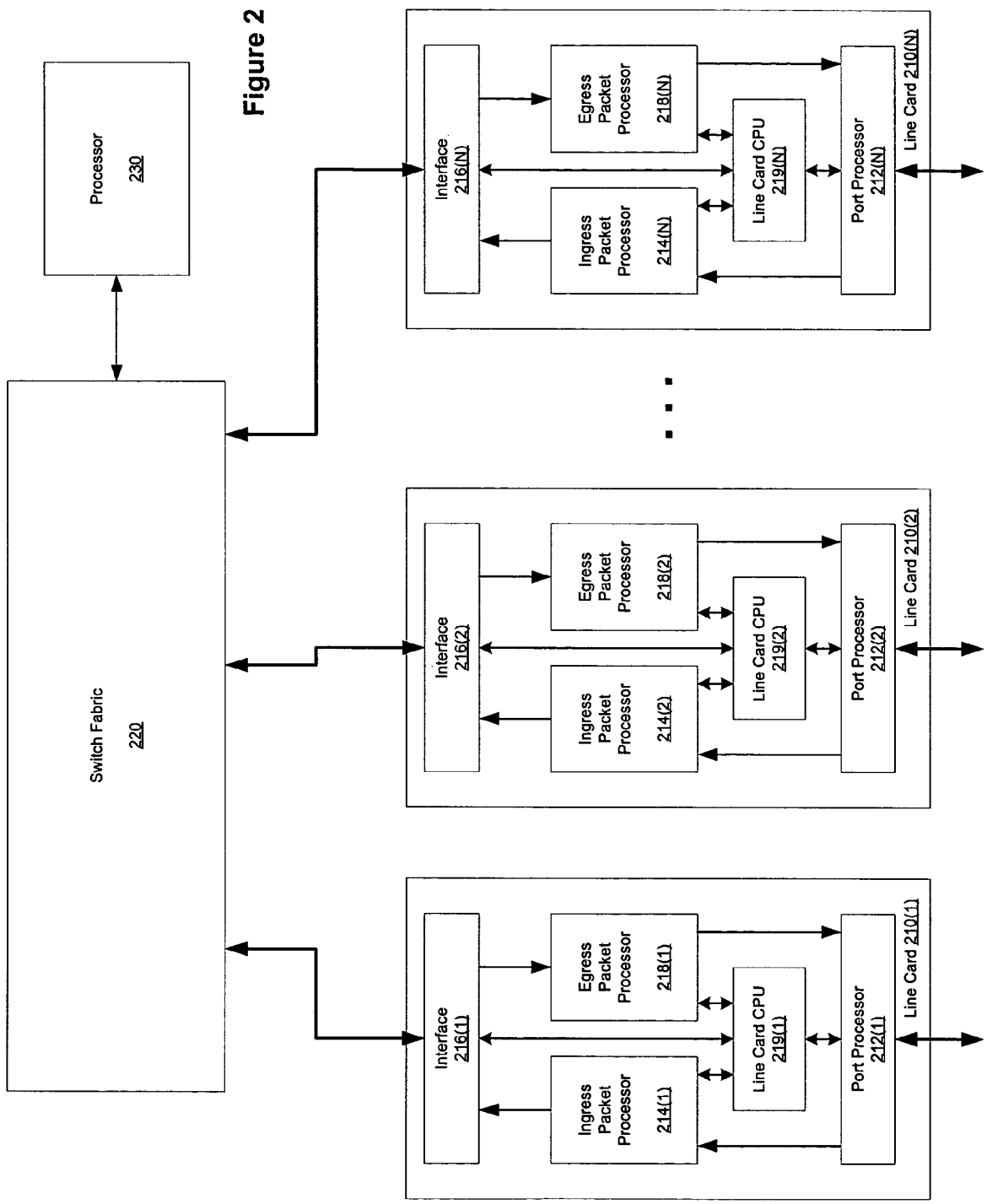
FIG. 2 is a block diagram illustrating a router.
Figure 3:
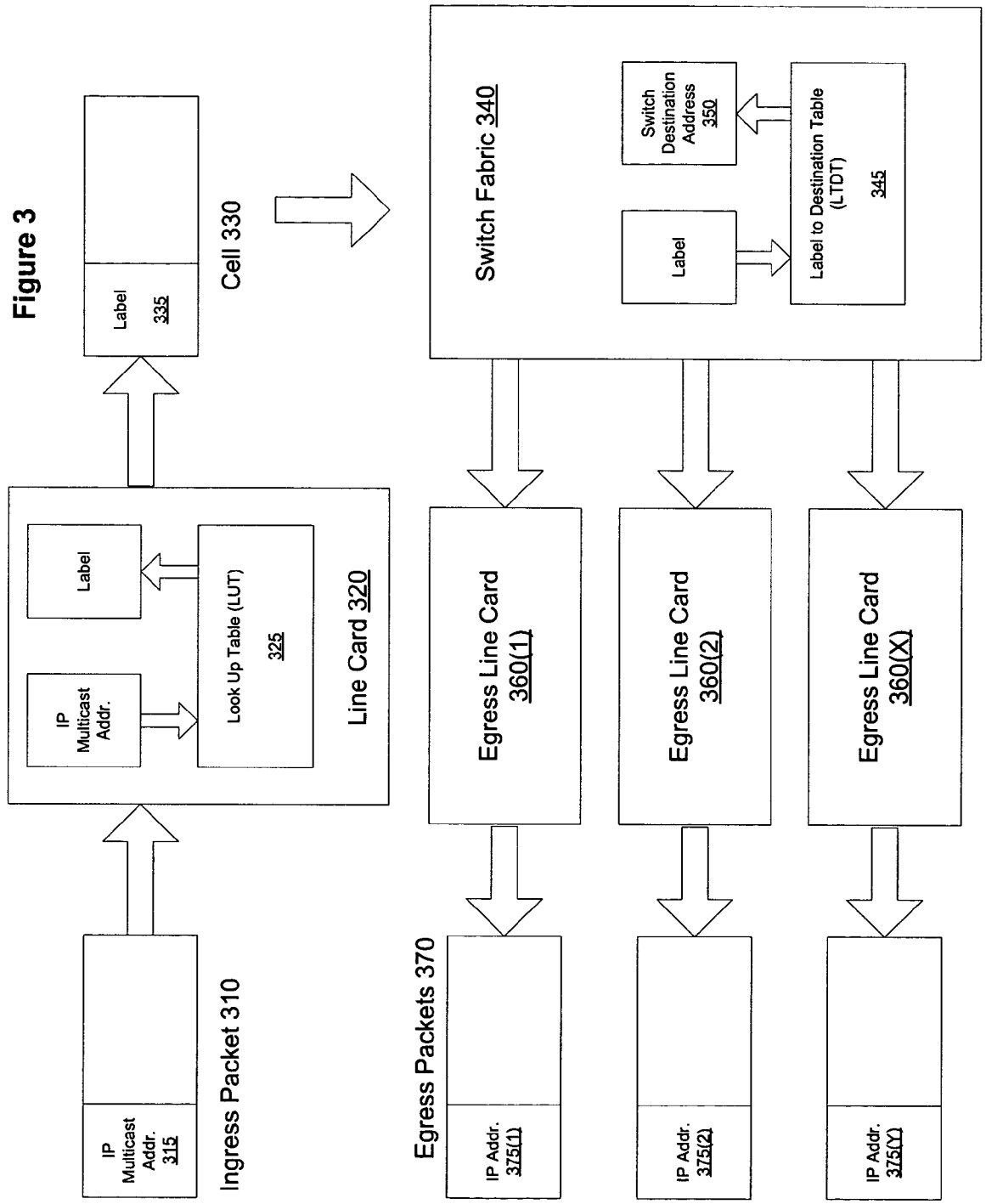
FIG. 3 is a block diagram illustrating certain operations of a router as a packet passes through the router.
Figures 4A, 4B:
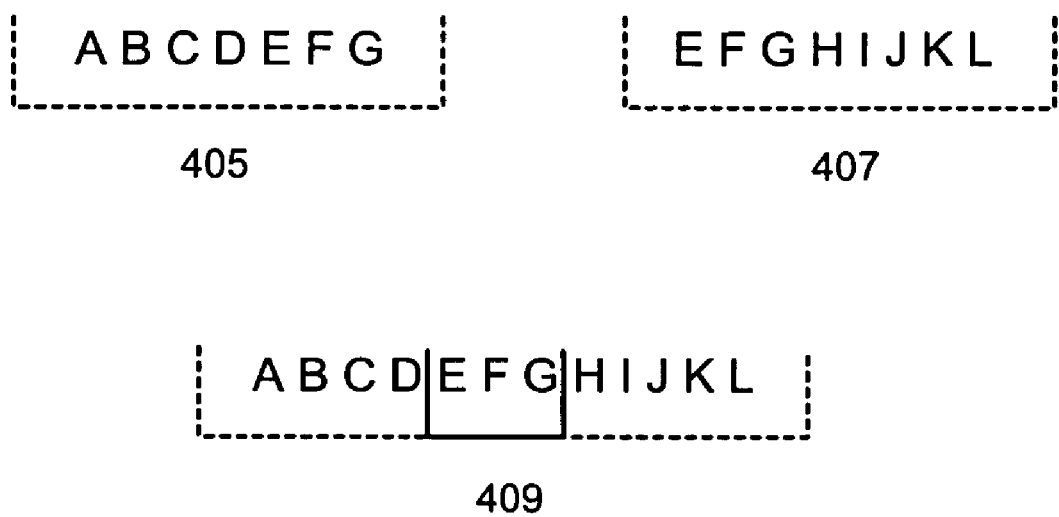
FIG. 4 illustrates a simplified visualization of measuring costs associated with including a multicast network destination address with other multicast destination addresses in accord with one embodiment of the present invention.

FIG. 4A demonstrates the concept of supercasting as addressed by the present invention. A first set of switch fabric destination ports {A, B, C, D, E, F, G} is represented in 405 and a second set of switch fabric destination ports {E, F, G, H, I, J, K, L} is represented in 407. If sets of switch fabric destination ports 405 and 407 were combined under the same label, then a cell multicast to that label would go to all the ports represented in 409 {A, B, C, D, E, F, G, H, I, J, K, L}. If subscribers to a multicast packet were represented by 405, then the traffic sent to the set of switch fabric ports {H, I, J, K, L} is the supercast traffic, or wasted bandwidth. Likewise, if subscribers to a multicast packet were represented by 407, then the traffic sent to the set of switch fabric ports {A, B, C, D} is supercast traffic. The objective is to map the number of possible destination addresses (N) to the number of available labels (M=$2^m$) so as to minimize the amount of wasted bandwidth due to supercasting.

Minimization of wasted bandwidth can be provided through "greedy-row clustering" methods. An LTDT can have M unique entries (M=$2^m$). The LTDT fills as each new multicast destination address arrives. Each new multicast switch fabric destination address is associated with a label (an index to the LTDT) as an in the LTDT. Once each label in the LTDT is associated with a destination address, any subsequent new multicast connection destination address will be combined (as discussed below) with an existing LTDT destination address, thus creating a supercast destination address. It is desired that the entry selected for combination will result in the least amount of bandwidth waste due to supercast.

In order to accomplish bandwidth waste minimization, one or more LTDT entries can be compared with the new multicast connection destination address to evaluate any additional supercasting associated with combining the two addresses. Two elements contributing to the increase in bandwidth use resulting from the combination of a new destination address with an existing LTDT entry are (1) the bandwidth increase incurred by the new destination address by being combined with the LTDT entry, and (2) the bandwidth increase incurred by the LTDT entry due to the addition of the new destination address.

A way of visualizing increase in bandwidth is shown in FIG. 4B. Destination address entries in an LTDT are illustrated at 410 as a matrix of ones and zeros, wherein a one represents a subscribing switch fabric port and a zero represents an unsubscribing switch fabric port. A new multicast destination address (11101111) (420) is compared to each table entry. Since bandwidth is wasted by sending packets to unsubscribing line cards, wasted bandwidth can be viewed as the inclusion of a one in a destination address bit where previously there was a zero. Thus, for each bit changed from a zero to a one, there is an increment in bandwidth waste. For example, the bandwidth waste of adding 420 to row 421 is 2, to row 422 is 3, and so on. These numbers represent the bandwidth increase incurred by the LTDT entry due to the addition of the new destination address. The bandwidth increase incurred by new destination address 420 in being combined with rows 421 or 422 is 0, and with rows 423 or 424 is 1.

Additional factors can be considered in a wasted bandwidth calculation, such as the amount of traffic already being supported by a destination address. Each LTDT entry can be weighted by a factor proportional or dependent upon the amount of traffic supported by that entry. Such traffic information can be provided at the time the destination address is entered, with such data being provided, for example, by a corresponding IP multicast protocol. The traffic information can be modified according to actual traffic experienced by the destination address over time.

To facilitate determination of a increase in wasted bandwidth due to the addition of a destination address to a current LTDT entry and the cost decrease due to a deletion of a destination address form a row entry (when a multicast connection is torn down), the following information can be maintained in memory separate from the LTDT for each LTDT entry: (1) the number of original destination addresses combined for the LTDT entry; (2) the number of zeros from the original destination addresses in each bit; (3) the sum of the weighting (traffic) of the original entries comprising the LTDT entry; and, (4) the calculated LTDT entry.

Figure 5:
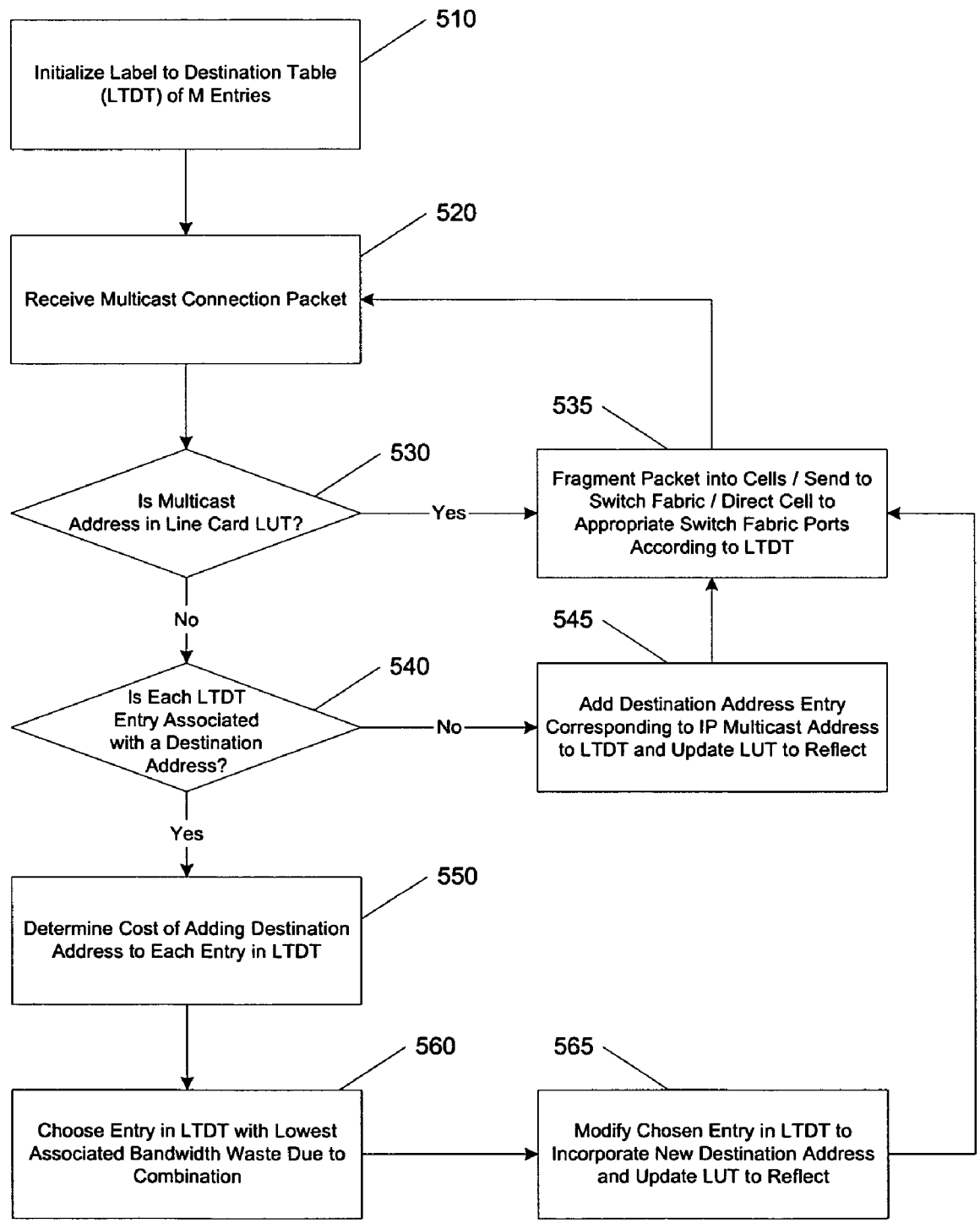
FIG. 5 is a simplified flow diagram illustrating a process to carry out greedy-row clustering in accord with one embodiment of the present invention.

FIG. 5 is a simplified flow diagram illustrating a process to carry out greedy-row clustering. Initially, an LTDT of M entries is initialized (510). A multicast packet is received (520), and it is determined whether the IP multicast address in the packet is already associated with a label (530) using a line card lookup table (e.g., LUT 325). If the multicast address is already corresponds to a label, then the packet is fragmented into cells and sent to the switch fabric and directed to appropriate destination ports after looking up the destination address in the LTDT (535).

If the IP multicast address in the packet is not already linked to a label, then it is determined whether every entry in the LTDT is associated with a switch fabric destination address (540). If the LTDT is not full, then a switch fabric destination address corresponding to the packet's IP multicast address is entered into the LTDT and the line card LUT is also updated to reflect the correspondence between the IP multicast address and the label (545). The packet is fragmented into cells, which are sent to the switch fabric and directed to appropriate switch fabric destination ports (535).

Should the LTDT have a destination address entered for each label, then the bandwidth waste due to adding a destination address corresponding to the new multicast address is determined for each LTDT entry (550). The LTDT entry with the lowest associated bandwidth waste for combining with the new destination address is chosen (560). The chosen LTDT entry is modified to incorporate the new multicast destination address and the line card LUT is also updated to reflect the correspondence between the IP multicast address and the label (565). The packet is then fragmented into cells incorporating the LTDT label, the cells are sent to the switch fabric and the packet is then sent to the appropriate switch fabric destination ports per the LTDT entry (535). Once an LTDT entry has been modified in this manner, packets sent to that label will be supercast.

Figure 6:
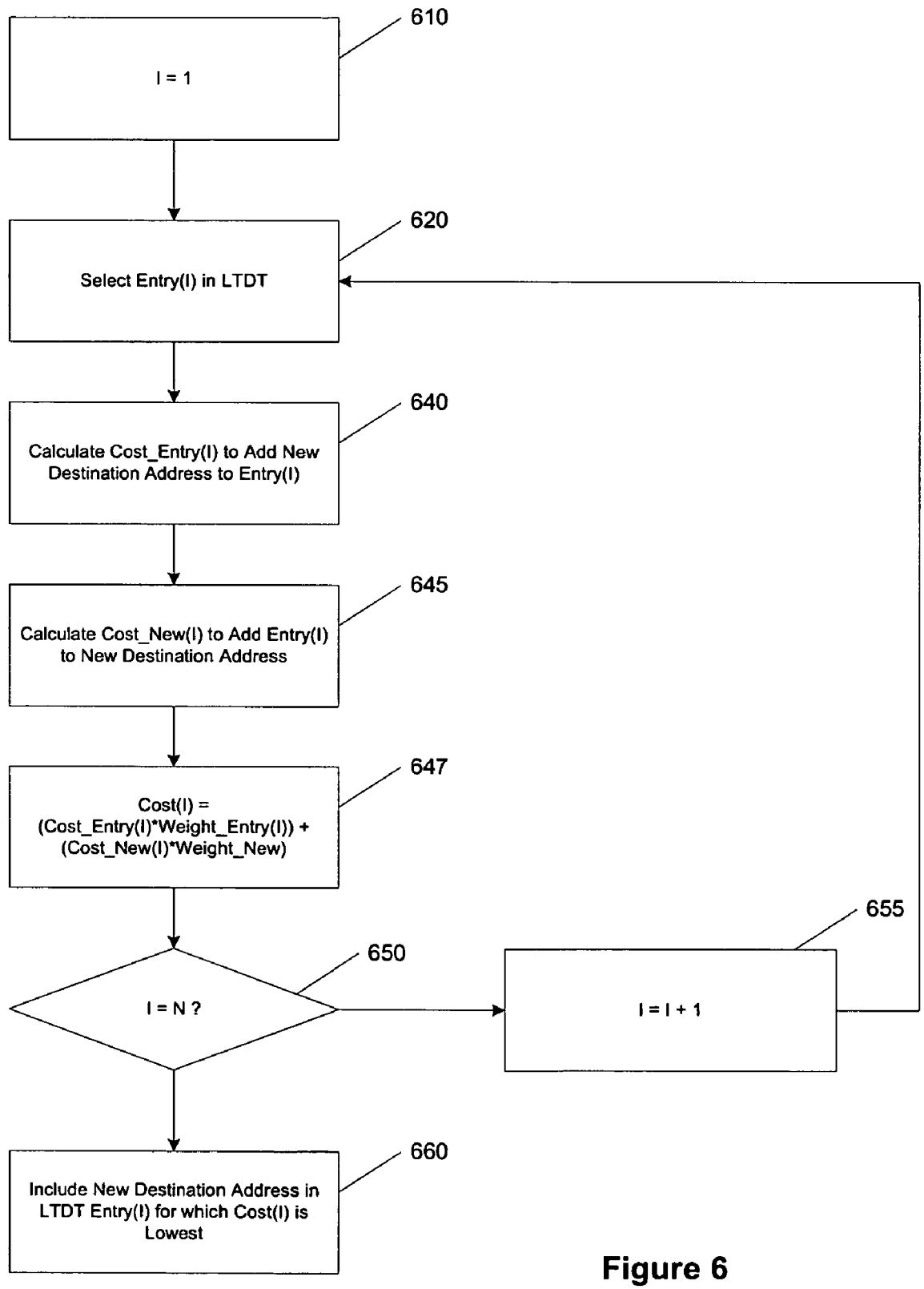
FIG. 6 is a simplified flow diagram illustrating an embodiment of a cost calculation according to one embodiment of the present invention.

FIG. 6 is a simplified flow diagram illustrating an embodiment of a wasted bandwidth calculation according to one embodiment of the present invention. A counter, I, is initialized (610) and then LTDT Entry(I) is selected. For each LTDT Entry(I), Cost_Entry(I) (wasted bandwidth) to add a new destination address to Entry(I) is calculated (640). Cost_New (I) to add the destination address in Entry(I) to the new destination address is also calculated (645). A total wasted bandwidth, Cost(I), associated with the inclusion of the new destination address with Entry(I) can be calculated including a weighting factor Weight_Entry(I) and Weight_New that is proportional to anticipated or actual traffic supported by the Entry(I) and the new destination address respectively (647). As stated above, cost is the aggregate of all bits for which a previously zero bit is changed to a one. The counter is then examined to determine whether each table entry has been examined (650), and, if not, the counter is incremented (655) and the process is repeated (620). Once the LTDT has been completely examined, then the multicast destination address is included in the LTDT entry for which Cost(I) is the lowest (660).

It should be noted that the present invention is not limited to the inclusion only of the above factors in calculating the wasted bandwidth due to including a destination address in a LTDT entry. Other factors appropriate to a specific implementation, as determined by persons of ordinary skill in the art, may be included in such a calculation.

In the event that an LTDT has a large number of entries (M), the time to calculate a wasted bandwidth to combine a new multicast address for each entry in the LTDT can be large. An alternate embodiment of the present invention allows for dividing each destination address in the LTDT into a plurality of disjoint parts each of which can be subjected to the wasted bandwidth calculation separately. In other words, for example, the LTDT destination addresses can be divided into sets of columns (e.g., the first four columns in 410 of FIG. 4B and the second four columns in 410) and considering the wasted bandwidth for each LTDT entry in each column set. Once all entries in both columns have been evaluated, the least wasted bandwidth can be calculated by combining the solutions for each column. Thus, the wasted bandwidth calculation is performed in two parts, the first set of columns and the second set of columns.

The method discussed above can be performed both on-line and off-line to update the LTDT. In the on-line method, LTDT entries become seeded by the order in which the first M new multicast connections are received. Therefore, there is a bias in the calculation of the LTDT. To eliminate this bias, greedy-row clustering can be performed off-line on all raw destination addresses (which can be stored in memory separate from the LTDT). The raw destination addresses can then be chosen at random to seed the addresses, thus eliminating the bias of the order of connections. Then all the destination addresses can be examined to determine the lowest bandwidth waste combinations of the addresses. A new, optimized LTDT can then be generated to replace the on-line LTDT, as well as a corresponding new LUT for the line cards.

Figure 7:
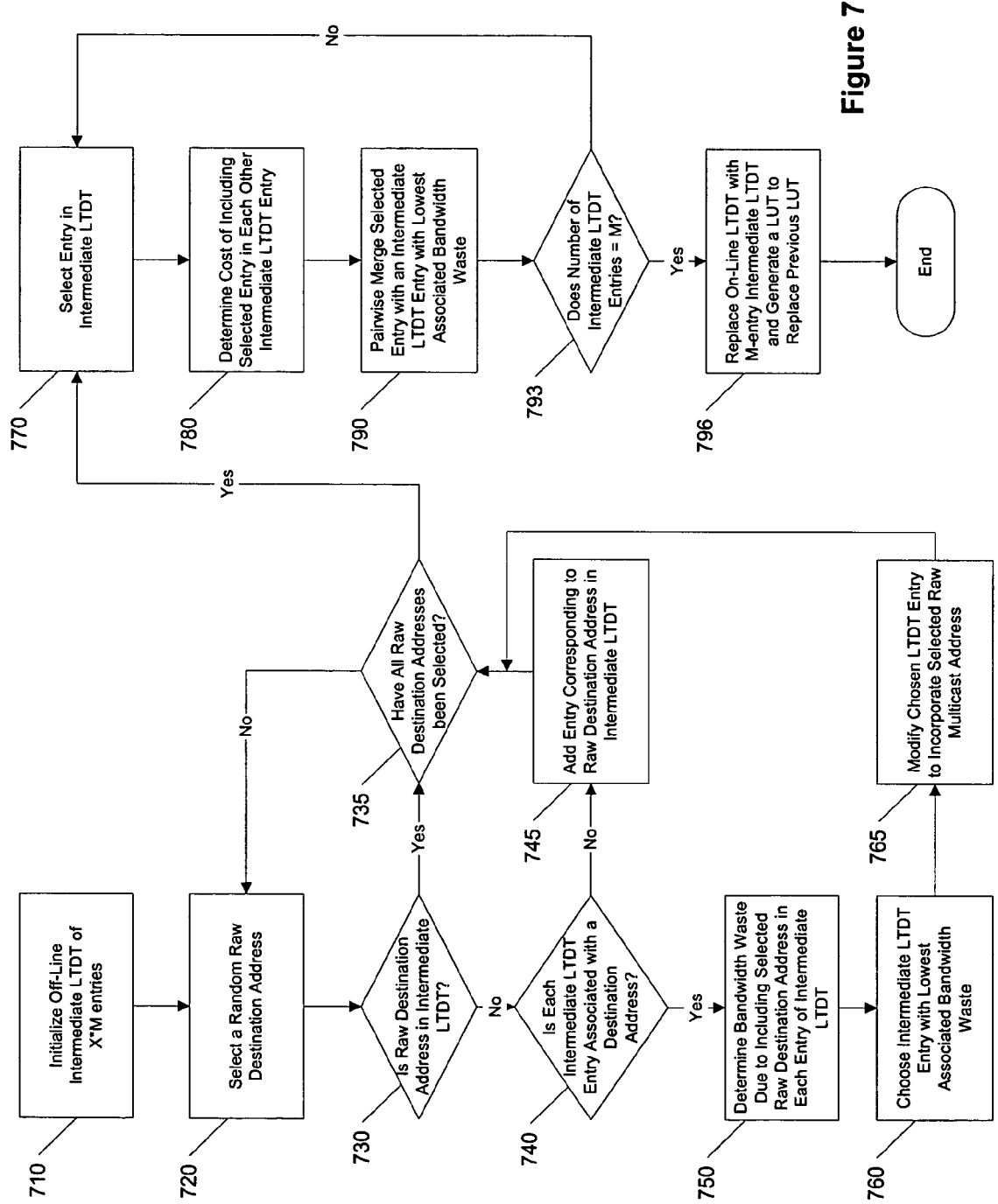
FIG. 7 is a simplified flow diagram illustrating an off-line row clustering method in accord with one embodiment of the present invention.

FIG. 7 is a simplified flow diagram illustrating an off-line row clustering method in accord with one embodiment of the present invention. This method is called "two-greedy row clustering" for reasons that will become apparent below. The calculations in this method are performed on tables that are not used by the switch fabric until the tables specifically replace the on-line LTDT. Such off-line methods can be more compute intensive and time-consuming than on-line methods, but will not affect the performance of the switch fabric since the methods are run off-line. Further, the invention is not limited to using the same LTDT calculation method off-line as is used on-line.

An intermediate LTDT can be initialized off-line (710), wherein the intermediate LTDT can have a multiple X*M entries, where X>1 and M is the number of LTDT entries in the on-line table. Using a multiple of the number of on-line LTDT entries in the off-line intermediate table permits an initially finer level of bandwidth waste minimization than an M-entry LTDT permits. The inventors have found X=4 to give good results, both analytically and experimentally.

A random raw (not combined with any other destination address) destination address is selected from memory (720) and it is determined whether the destination address is already entered in the intermediate LTDT (730). If so, then it is determined whether all the raw destination addresses have been selected (735). If all the raw destination addresses have not been selected, then a new raw destination address is selected. If all the raw destination addresses have been selected, the second stage of the method is performed, as will be presented below.

If the raw destination address is not already entered in the intermediate LTDT, then it is determined whether each entry of the intermediate LTDT is associated with a destination address (740). If not, then the raw destination address is entered into the intermediate LTDT (745).

If each intermediate LTDT entry is associated with a destination address, then a wasted bandwidth calculation (such as that discussed above for the greedy-row clustering method) is made to determine the bandwidth waste due to adding the selected raw destination address to each entry of the intermediate LTDT (750). The intermediate LTDT entry with the lowest associated bandwidth waste due to including the selected raw destination address is chosen (760) and the intermediate LTDT entry is modified to include the destination address (765).

Once all raw destination addresses have been selected and included in the X*M-entry intermediate LTDT (735), the number of entries in the intermediate LTDT can be reduced to M-entries (or a selected smaller number, if desired) in preparation for bringing an optimized LTDT on-line. An entry in the intermediate LTDT is selected (770) and bandwidth waste due to including the entry into each other entry in the intermediate LTDT is determined (780). A pairwise merge is performed to include the selected intermediate LTDT entry into the entry with the lowest associated bandwidth waste (790). If the number of entries in the intermediate LTDT is not equal to M (793), then another entry is selected and the pairwise merging process continues until the intermediate LTDT has M entries. After this second greedy-row clustering/pairwise merge process, the intermediate LTDT is ready to replace the on-line LTDT (796).

Figure 8:
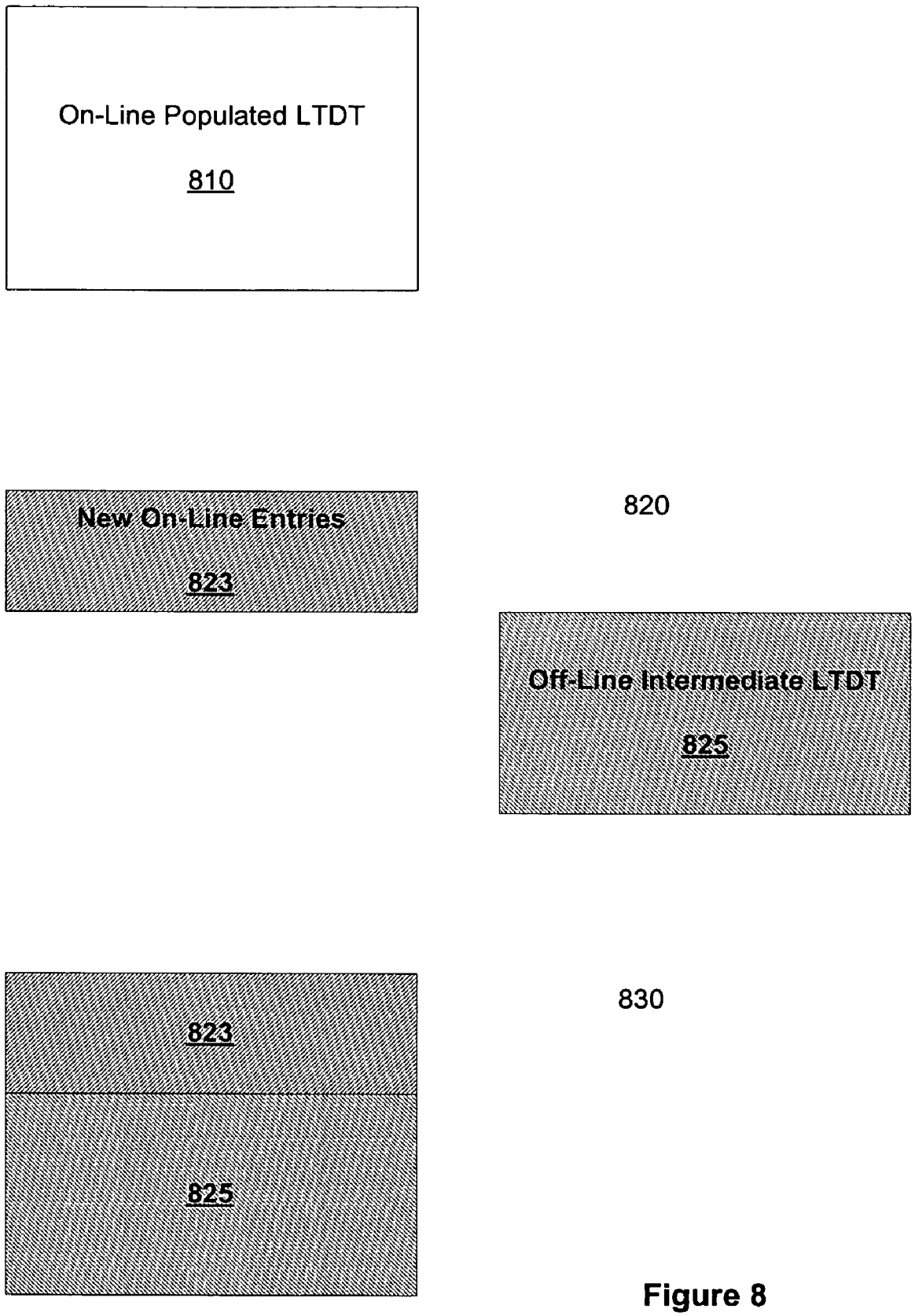
FIG. 8 is a simplified block diagram illustrating the state of an on-line LTDT before/during/after generation and replacement by an off-line intermediate LTDT in accord with one embodiment of the present invention.

FIG. 8 is a simplified block diagram illustrating the state of an on-line LTDT before/during/after generation and replacement by an off-line intermediate LTDT. An on-line LTDT (810) can be generated by an on-line method as described above. When an off-line intermediate LTDT is generated (825), destination addresses received during the period of generation are entered into the on-line LTDT (823) which has been otherwise cleared (870). Once the off-line intermediate LTDT is ready for on-line use, the intermediate LTDT can be appended to the entries in the on-line LTDT (830). Once the LTDT is formed, subsequently received destination addresses can be included in either only the on-line section of the LTDT (823) or in the entire LTDT (823+825).

An Example Computing And Network Environment

As shown above, the present invention can be implemented using a variety of computer systems and networks. An example of one such computing and network environment is described below with reference to FIGS. 9 and 10.

Figure 9:
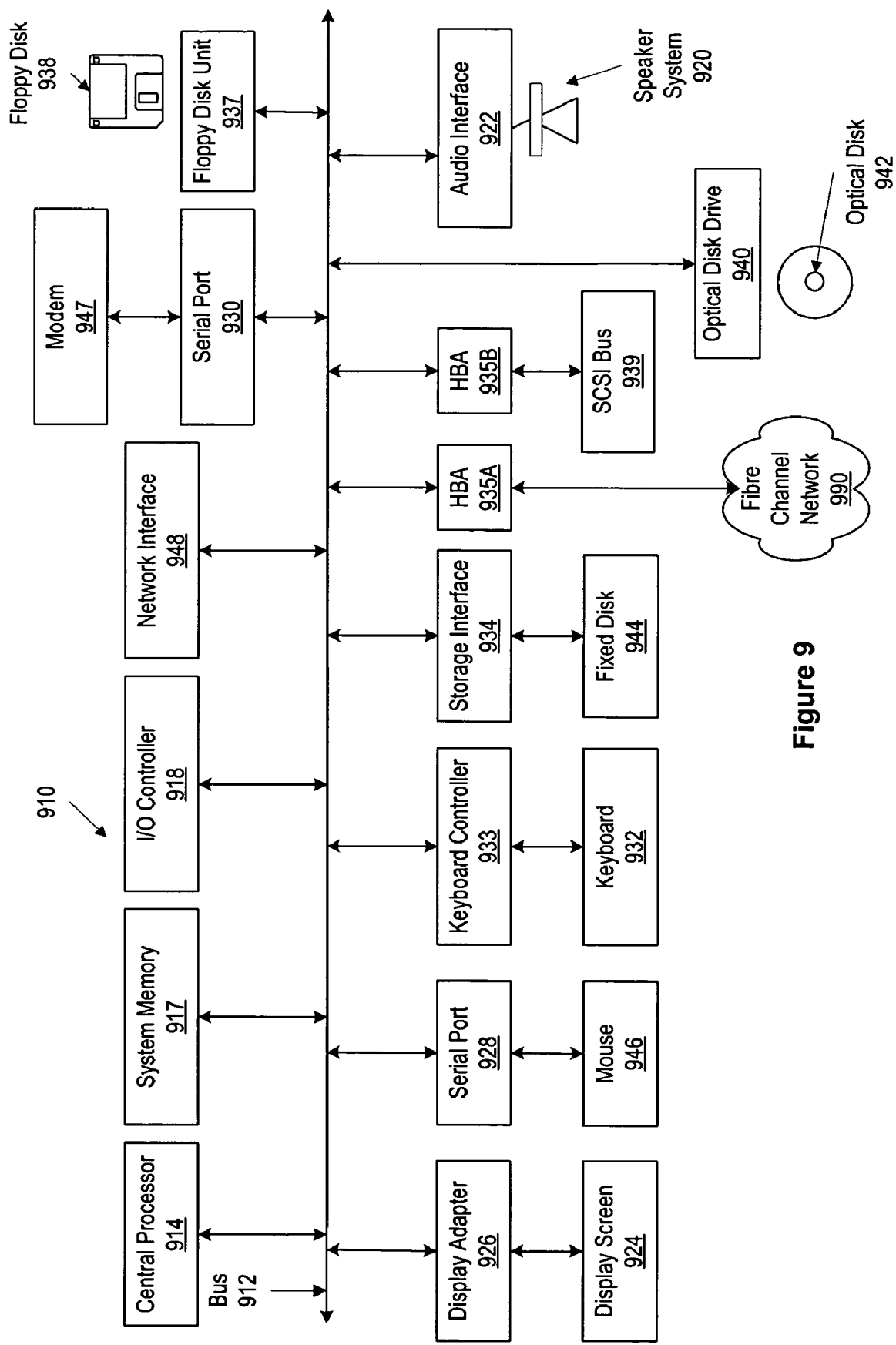
FIG. 9 depicts a block diagram of a computer system suitable for implementing embodiments of the present invention.

FIG. 9 depicts a block diagram of a computer system 910 suitable for implementing the present invention. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a fibre channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 9 need not be present to practice the present invention. The devices and subsystems can be interconnected in different ways from that shown in FIG. 9. The operation of a computer system such as that shown in FIG. 9 is readily known in the art and is not discussed in detail in this application. Code to implement the present invention can be stored in computer-readable storage media such as one or more of system memory 917, fixed disk 944, optical disk 942, or floppy disk 938. Additionally, computer system 910 can be any kind of computing device, and so includes personal data assistants (PDAs), network appliance, X-window terminal or other such computing devices. The operating system provided on computer system 910 may be MS-DOS®, MS-WINDOWS®, OS/2®, UNIX®, Linux®, or another known operating system. Computer system 910 also supports a number of Internet access tools, including, for example, an HTTP-compliant web browser having a JavaScript interpreter, such as Netscape Navigator®, Microsoft Internet Explorer®, and the like.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
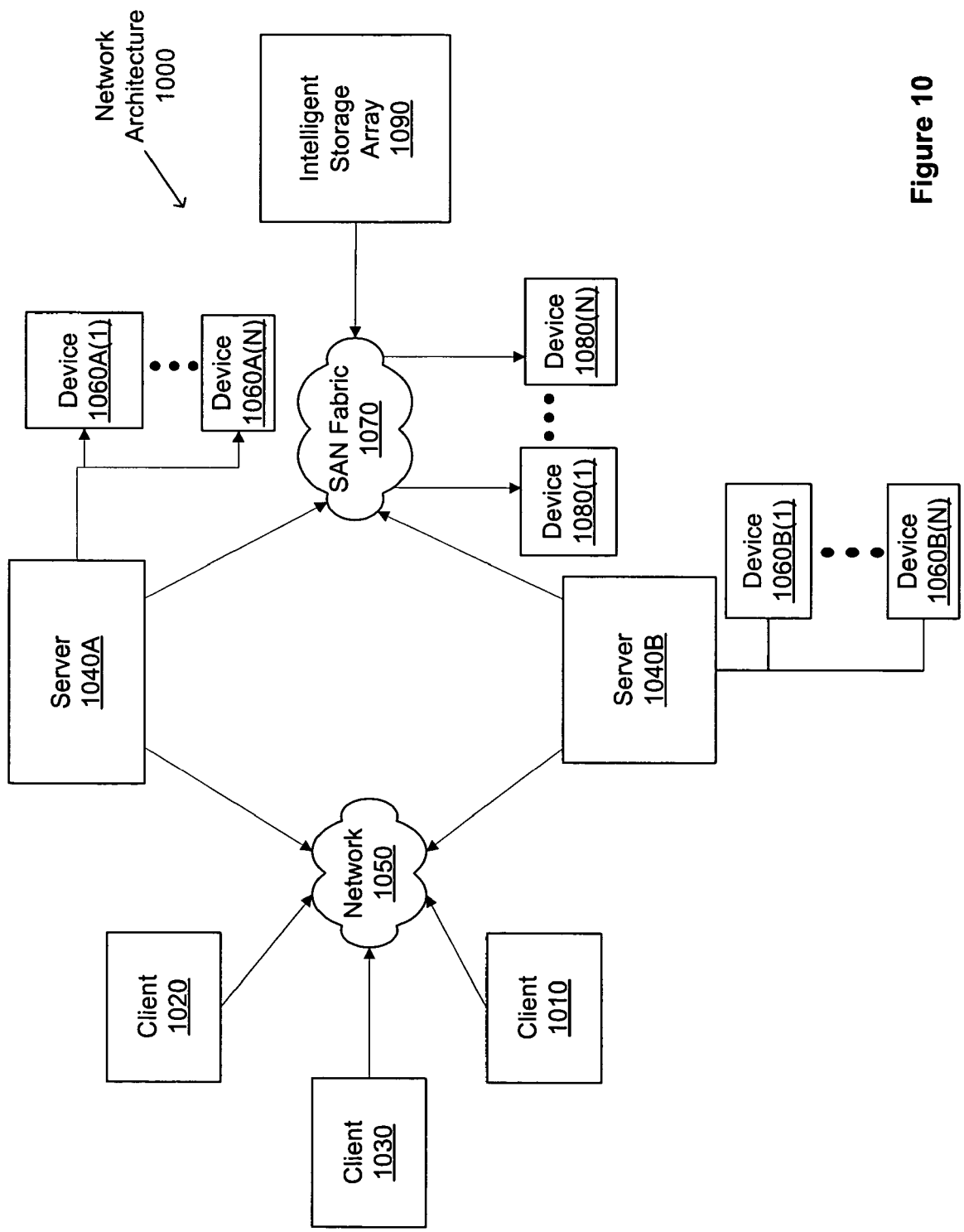
FIG. 10 depicts a block diagram of a network architecture suitable for implementing embodiments of the present invention.

FIG. 10 is a block diagram depicting another example of a network architecture 1000 in which client systems 1010, 1020 and 1030, as well as storage servers 1040A and 1040B (any of which can be implemented using computer system 910), are coupled to a network 1050. Storage server 1040A is further depicted as having storage devices 1060A(1)-(N) directly attached, and storage server 1040B is depicted with storage devices 1060B(1)-(N) directly attached. Storage servers 1040A and 1040B are also connected to a SAN fabric 1070, although connection to a storage area network is not required for operation of the invention. SAN fabric 1070 supports access to storage devices 1080(1)-(N) by storage servers 1040A and 1040B, and so on by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020 and 1030 to network 1050. Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 1040B or one of storage devices 1060A(1)-(N), 1060B(1) (N), 1080(1)-(N) or intelligent storage array 1090. FIG. 10 depicts the use of a network such as the Internet for exchanging data, but the present invention is not limited to the Internet or any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 910). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, irremovably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   determining by a processor a first wasted bandwidth due to combining a first destination address with a second destination address, wherein
      the first destination address corresponds to a first multicast group address,
      the second destination address corresponds to a second multicast group address, and
      the first wasted bandwidth comprises a first weighting factor proportional to a rate at which data packets are transmitted to the second multicast group address;
   determining by a processor a second wasted bandwidth due to combining the first destination address with a third destination address, wherein
      the third destination address corresponds to a third multicast group address, and
      the second wasted bandwidth comprises a second weighting factor proportional to a rate at which data packets are transmitted to the third multicast group address; and
   combining the first destination address and the second destination address if the first wasted bandwidth is less than the second wasted bandwidth, or combining the first destination address and the third destination address if the first wasted bandwidth is more than the second wasted bandwidth.

2. The method of claim 1 wherein determining the first wasted bandwidth due to combining the first destination address with the second destination address further comprises:
   comparing the first destination address with second destination address, wherein
      the first destination address identifies a first set of switch fabric ports, and
      the second destination address identifies a second set of switch fabric ports;
   determining a first cost element, wherein
      the first cost element comprises a number of switch fabric ports in the first set of switch fabric ports and not in the second set of switch fabric ports; and
   weighting the first cost element by the first weighting factor.

3. The method of claim 2 further comprising:
   calculating the rate at which data packets are transmitted to the second multicast group address using one or more of
      a provided rate for the second multicast group address, and
      collected network traffic data.

4. The method of claim 2 wherein determining the first wasted bandwidth due to combining the first destination address with the second destination address further comprises:
   determining a second cost element, wherein
      the second cost element comprises a number of switch fabric ports in the second set of switch fabric ports and not identified in the first set of switch fabric ports;
   weighting the second cost element by a factor proportional to a rate at which data packets are transmitted to the first multicast group address; and
   combining the first weighted cost element and the second weighted cost element.

5. The method of claim 1 wherein determining the first wasted bandwidth due to combining the first destination address with the second destination address comprises:

determining a number of data packets dropped due to incorporating the first destination address in the second destination address.

6. The method of claim 1 further comprising:
determining a wasted bandwidth due to combining a selected one of a plurality of destination addresses with selected others of the plurality of destination addresses, wherein
  the second destination address and the third destination address are members of the plurality of destination addresses; and
merging the selected one of the plurality of destination addresses with a second of the plurality of destination addresses, wherein
  the second of the plurality of destination addresses has the lowest associated determined wasted bandwidth.

7. The method of claim 6 further comprising:
performing said determining and merging until a desired number of the plurality of destination addresses remain.

8. The method of claim 7 further comprising:
incorporating the desired number of the plurality of destination addresses into a second plurality of destination addresses, wherein
  the second plurality of destination addresses comprises zero or more destination addresses.

9. The method of claim 8 further comprising:
generating the plurality of destination addresses off-line, wherein
  the plurality of destination addresses are not used by a switch fabric prior to said incorporating into the second plurality of destination addresses; and
generating the second plurality of destination addresses on-line, wherein
  the second plurality of destination addresses further comprises
    a fourth destination address received during said generating the plurality of destination addresses off-line.

10. A system comprising:
a plurality of network line cards, wherein
  each network line card is configured to receive a first network packet,
  each network line card is configured to transmit a second network packet wherein,
  the first network packet comprises a first multicast group address;
a switch fabric comprising a plurality of ports, wherein
  each of the plurality of ports is coupled to a corresponding one of the plurality of network line cards; and
a processor coupled to the switch fabric and configured to
  determine a first wasted bandwidth due to combining a first destination address with a second destination address, wherein
    the first destination address corresponds to the first multicast group address and identifies a first subset of the plurality of switch fabric ports,
    the second destination address identifies a second subset of the plurality of switch fabric ports, and
    the first wasted bandwidth comprises a first weighting factor proportional to a rate at which data packets are transmitted to the second destination address,
  determine a second wasted bandwidth due to combining the first destination address with a third destination address, wherein
    the third destination address identifies a third subset of the plurality of switch fabric ports, and
    the second wasted bandwidth comprises a second weighting factor proportional to a rate at which data packets are transmitted to the third multicast group address, and
  combine the first destination address and the second destination address if the first wasted bandwidth is less than the second wasted bandwidth, or combining the first destination address and the third destination address if the first wasted bandwidth is more than the second wasted bandwidth.

11. The system of claim 10 further comprising:
the processor further configured to
  compare the first destination address with the second destination address, wherein
    the first destination address identifies a first set of switch fabric ports, and
    the second destination address identifies a second set of switch fabric ports, and
  determine a first cost element, wherein
    the first cost element comprises a number of switch fabric ports in the first set of switch fabric ports and not in the second set of switch fabric ports, and
  weight the first cost element by the first weighting factor.

12. The system of claim 11 further comprising:
the processor further configured to
  determine a second cost element, wherein
    the second cost element comprises a number of switch fabric ports in the second set of switch fabric ports and not identified in the first set of switch fabric ports,
  weight the second cost element by a factor proportional to a rate at which data packets are transmitted to the first multicast group address, and
  combine the first weighted cost element and the second weighted cost element.

13. The system of claim 10 further comprising:
the processor further configured to
  determine a wasted bandwidth due to combining a selected one of a plurality of destination addresses with selected others of the plurality of destination addresses, wherein
    the second destination address and the third destination address are members of the plurality of destination addresses,
  merge the selected one of the plurality of destination addresses with a second of the plurality of destination addresses, wherein
    the second of the plurality of destination addresses has the lowest associated determined wasted bandwidth, and
  perform said determining and merging until a desired number of the plurality of destination addresses remain.

14. The system of claim 13 further comprising:
the processor further configured to
  incorporate the desired number of the plurality of destination addresses into a second plurality of destination addresses, wherein
    the second plurality of destination addresses comprises zero or more destination addresses.

15. The system of claim 14 further comprising:
the processor further configured to
  generate the plurality of destination addresses off-line, wherein
    the plurality of destination addresses are not used by a switch fabric prior to said incorporating into the second plurality of destination addresses; and generate the second plurality of destination addresses on-line, wherein
the second plurality of destination addresses further comprises a fourth destination address received during said generating the plurality of destination addresses off-line.

16. A computer readable storage medium comprising:
a first set of instructions, executable on a processor in a network communication node, configured to determine a first wasted bandwidth due to combining a first destination address with a second destination address, wherein
the first destination address corresponds to a first multicast group address,
the second destination address corresponds to a second multicast group address, and
the first wasted bandwidth comprises a first weighting factor proportional to a rate at which data packets are transmitted to the second multicast group address;
a second set of instructions, executable on the processor, configured to determine a second wasted bandwidth due to combining the first destination address with a third destination address, wherein
the third destination address corresponds to a third multicast group address, and
the second wasted bandwidth comprises a second weighting factor proportional to a rate at which data packets are transmitted to the third multicast group address; and
a third set of instructions, executable on the processor, configured to combine the first destination address and the second destination address if the first wasted bandwidth is less than the second wasted bandwidth, or to combine the first destination address and the third destination address if the first wasted bandwidth is more than the second wasted bandwidth.

17. The computer readable storage medium of claim 16 wherein the first set of instructions further comprises:
a fourth set of instructions, executable on the processor, configured to compare the first destination address with the second destination address, wherein
the first destination address identifies a first set of switch fabric ports, and
the second destination address identifies a second set of switch fabric ports;
a fifth set of instructions, executable on the processor, configured to determine a first cost element, wherein
the first cost element comprises a number of switch fabric ports in the first set of switch fabric ports and not in the second set of switch fabric ports; and
a sixth set of instructions, executable on the processor, configured to weight the first cost element by the first weighting factor.

18. The computer readable storage medium of claim 17 wherein the first set of instructions further comprises:
a seventh set of instructions, executable on the processor, configured to determine a second cost element, wherein
the second cost element comprises a number of switch fabric ports in the second set of switch fabric ports and not identified in the first set of switch fabric ports;
an eighth set of instructions, executable on the processor, configured to weight the second cost element by a factor proportional to a rate at which data packets are transmitted to the first multicast group address; and
a ninth set of instructions, executable on the processor, configured to combine the first weighted cost element and the second weighted cost element.

19. The computer readable storage medium of claim 16 further comprising:
a tenth set of instructions, executable on the processor, configured to determine a wasted bandwidth due to combining a selected one of a plurality of destination addresses with selected others of the plurality of destination addresses, wherein
the second destination address and the third destination address are members of
the plurality of destination addresses;
an eleventh set of instructions, executable on the processor, configured to merge the selected one of the plurality of destination addresses with a second of the plurality of destination addresses, wherein
the second of the plurality of destination addresses has the lowest associated determined wasted bandwidth; and
a twelfth set of instructions, executable on the processor, configured to perform said determining and merging until a desired number of the plurality of destination addresses remain.

20. The computer readable storage medium of claim 19 further comprising:
a thirteenth set of instructions, executable on the processor, configured to incorporate the desired number of the plurality of destination addresses into a second plurality of destination addresses, wherein
the second plurality of destination addresses comprises zero or more destination addresses.

21. The computer readable storage medium of claim 20 further comprising:
a fourteenth set of instructions, executable on the processor, configured to generate the plurality of destination addresses off-line, wherein
the plurality of destination addresses are not used by a switch fabric prior to said incorporating into the second plurality of destination addresses; and
a fifteenth set of instructions, executable on the processor, configured to generate the second plurality of destination addresses on-line, wherein
the second plurality of destination addresses further comprises
a fourth destination address received during said generating the plurality of destination addresses off-line.

22. An apparatus comprising:
a plurality of network line cards, wherein
each network line card is disposed for receiving a first network packet,
each network line card is disposed for transmitting a second network packet wherein,
the first network packet comprises a first multicast group address;
a switch fabric comprising a plurality of ports, wherein
each of the plurality of ports is coupled to a corresponding one of the plurality of network line cards;
means for determining a first wasted bandwidth due to combining a first destination address with a second destination address, wherein
the first destination address corresponds to the first multicast group address,
the second destination address corresponds to a second multicast group address, and
the first wasted bandwidth comprises a first weighting factor proportional to a rate at which data packets are transmitted to the second multicast group address;

means for determining a second wasted bandwidth due to combining the first destination address with a third destination address, wherein
  the third destination address corresponds to a third multicast group address, and
  the second wasted bandwidth comprises a second weighting factor proportional to a rate at which data packets are transmitted to the third multicast group address; and means for combining the first destination address and the second destination address if the first wasted bandwidth is less than the second wasted bandwidth, or
  combining the first destination address and the third destination address if the first wasted bandwidth is more than the second wasted bandwidth.

\* \* \* \* \*